United States Patent
Qiu

(10) Patent No.: US 10,831,915 B2
(45) Date of Patent: Nov. 10, 2020

(54) METHOD AND SYSTEM FOR ISOLATING APPLICATION DATA ACCESS

(71) Applicant: Alibaba Group Holding Limited, George Town (KY)

(72) Inventor: Shaoxiang Qiu, Hangzhou (CN)

(73) Assignee: Alibaba Group Holding Limited (KY)

( * ) Notice: Subject to any disclaimer, the term of this patent is extended or adjusted under 35 U.S.C. 154(b) by 214 days.

(21) Appl. No.: 16/028,107

(22) Filed: Jul. 5, 2018

(65) Prior Publication Data

US 2019/0005260 A1    Jan. 3, 2019

Related U.S. Application Data

(63) Continuation-in-part of application No. PCT/CN2016/112555, filed on Dec. 28, 2016.

(30) Foreign Application Priority Data

Jan. 7, 2016   (CN) .......................... 2016 1 0009961

(51) Int. Cl.
  *G06F 21/00*   (2013.01)
  *G06F 21/62*   (2013.01)

(52) U.S. Cl.
  CPC .. *G06F 21/6218* (2013.01); *G06F 2221/2105* (2013.01); *G06F 2221/2141* (2013.01)

(58) Field of Classification Search
  CPC ......... G06F 21/6218; G06F 2221/2105; G06F 2221/2141
  See application file for complete search history.

(56) References Cited

U.S. PATENT DOCUMENTS

| | | | |
|---|---|---|---|
| 6,202,099 B1 | 3/2001 | Gillies | |
| 6,782,403 B1 | 8/2004 | Kino | |
| 7,792,834 B2 * | 9/2010 | Sorensen | G06F 16/489 707/736 |
| 8,024,794 B1 * | 9/2011 | Feldman | G06F 21/6218 235/382 |
| 8,881,236 B2 * | 11/2014 | Wang | H04L 67/2819 726/3 |
| 8,910,277 B1 * | 12/2014 | Reis | G06F 9/468 726/22 |
| 9,313,193 B1 * | 4/2016 | Mehta | H04L 63/06 |

(Continued)

FOREIGN PATENT DOCUMENTS

| | | |
|---|---|---|
| CN | 102495988 | 6/2012 |
| CN | 102567675 | 7/2012 |

(Continued)

*Primary Examiner* — Mahfuzur Rahman
(74) *Attorney, Agent, or Firm* — Van Pelt, Yi & James LLP

(57) ABSTRACT

Isolating application data access is disclosed including receiving a request from a first application to access data of a second application, determining whether the first application is in a domain that has access authorization to the data of the second application, in response to a determination that the first application is in a domain that has access authorization to the data of the second application, permitting the first application to perform the access operation, and in response to a determination that the first application is not in a domain that has access authorization to the data of the second application, denying the first application permission to perform the access operation.

18 Claims, 4 Drawing Sheets

(56) References Cited

U.S. PATENT DOCUMENTS

| | | | |
|---|---|---|---|
| 9,501,273 B1 * | 11/2016 | Dai | G06F 8/65 |
| 2003/0084404 A1 * | 5/2003 | Dweck | G06F 16/38 |
| | | | 715/255 |
| 2006/0294199 A1 * | 12/2006 | Bertholf | G06F 16/972 |
| | | | 709/217 |
| 2007/0136603 A1 * | 6/2007 | Kuecuekyan | H04L 63/105 |
| | | | 713/185 |
| 2008/0021925 A1 * | 1/2008 | Sweeney | G06N 5/02 |
| 2011/0083164 A1 * | 4/2011 | Benantar | H04L 63/104 |
| | | | 726/4 |
| 2012/0233608 A1 * | 9/2012 | Toeroe | G06F 9/45558 |
| | | | 718/1 |
| 2012/0284195 A1 * | 11/2012 | McMillen | G06Q 20/3278 |
| | | | 705/71 |
| 2014/0068779 A1 | 3/2014 | Tan | |
| 2014/0208415 A1 | 7/2014 | Legault | |

FOREIGN PATENT DOCUMENTS

| | | | |
|---|---|---|---|
| CN | 106331206 A | * | 1/2017 |
| CN | 106331206 B | * | 8/2019 |
| EP | 1806674 | | 7/2007 |

* cited by examiner

1200

METHOD AND SYSTEM FOR ISOLATING APPLICATION DATA ACCESS

CROSS REFERENCE TO OTHER APPLICATIONS

This application is a continuation-in-part of and claims priority to International (PCT) Application No. PCT/CN16/112555 entitled APPLICATION PROGRAM DATA ACCESS ISOLATION METHOD AND DEVICE, filed Dec. 28, 2016 which is incorporated herein by reference in its entirety for all purposes, which claims priority to China Patent Application No. 201610009961.8 entitled AN APPLICATION DATA ACCESS ISOLATION METHOD AND DEVICE, filed on Jan. 7, 2016 which is incorporated by reference in its entirety for all purposes.

FIELD OF THE INVENTION

The present application relates to a method and a system for isolating application data access.

BACKGROUND OF THE INVENTION

Terminal equipment, such as personal computers and smart phones, has become useful components of people's lives. Such terminal equipment typically have various applications installed that provide people with various service functions, such as weather advisories, shopping, chatting, camera, e-mailing, etc. The various applications typically store data related to the running of each application in directories of the file system, and the applications access the data as needed during operation. To ensure the stability and security of system operations as a whole, providing data access isolation techniques between different applications would be beneficial.

Of these data access isolation techniques, one data access isolation technique is as follows: applications are kept in a state of total isolation from each other, i.e., each application can only access its own data, and cannot access the data of other applications. By employing such a strict isolation technique, applications maliciously accessing the data of other applications can be avoided, but in some scenarios, some applications (for example, certain trusted applications produced by the same manufacturer) are to share data, and strict isolation techniques make data sharing difficult among trusted applications.

To address the above issue, some systems permit some applications to mutually access data. For example, the Android system permits applications or apps installed on smart phones having the same signature to access each other's data. For example, the same private key is used to sign applications that include the data sharing function then the manifest file is used to assign these applications the same user ID (i.e., UID), and the applications having the same UID can access each other's data to implement data sharing with one another. In other words, the Android isolation technique is isolation based on the UID, which means: applications by the same author can access each other's data.

Although the above UID-based isolation technique achieves data sharing for some applications, based on data isolation, requiring that the applications have the same signature, the UID-based isolation technique is one-dimensional and too rigid, limits the freedom of application data access isolation, and cannot satisfy relatively complex application data isolation requirements.

SUMMARY OF THE INVENTION

The embodiments of the present application disclose a process for isolating application data access to resolve existing problems of isolation techniques that are too simple and unable to satisfy complex application data isolation requirements. The embodiments of the present application further disclose a system for isolating application data access.

The process for isolating application data access includes:
receiving a request from a first application to access data of a second application;
determining whether the first application is in a domain that has access authorization to the data of the second application;
in response to a determination that the first application is in the domain that has access authorization to the data of the second application, permitting the first application to perform the access operation;
in response to a determination that the first application is not in the domain that has access authorization to the data of the second application, denying authorization for the first application to perform the access operation.

In some embodiments, each application belongs to one domain, and has domain attributes that identify the domain to which each application belongs. Applications that belong to the same domain can access each other's data; preset hierarchical relationships between different domains exist; and application data access rules exist based on the hierarchical relationships.

In some embodiments, the following process is used to set up the application domain attributes in advance:
during installation of an application, the domain attributes are set up based on application configuration information included in an installation package associated with the application.

In some embodiments, the application domain attributes are set up in advance based on preset rules.

In some embodiments, the preset hierarchical relationships include: directly or indirectly included parent-child domain relationships.

In some embodiments, application data access rules based on the hierarchical relationships include: applications in a child domain can access data of applications in a parent domain, and other applications belonging to different domains cannot mutually access data.

In some embodiments, a determination as to whether the first application is in a domain that has access authorization to the data of the second application comprises:
determining whether the first application satisfies one of the following access conditions: the first application belongs to the same domain as the second application, or the domain to which the first application belongs is a child domain of the domain to which the second application belongs;
in response to a determination that the first application satisfies one of the access conditions, determining the first application to be in a domain that has access authorization to the data of the second application;
in response to a determination that the first application does not satisfy one of the access conditions, determining that the first application is not in the domain that has access authorization.

In some embodiments, before the request from the first application to access the data of the second application is received, the following operations are performed:

assigning a unique application identifier respectively to each application, each preset domain respectively to a unique group, and a unique group identifier respectively to each group;

specifying a group identifier corresponding to the domain to which the relevant application belongs for the data of each application;

adding the identifier of each application into the group corresponding to the domain to which the application belongs, and the group corresponding to the parent domain of the group to which it belongs:

In some embodiments, the determining of whether the first application satisfies one of the data access conditions comprises:

determining whether the identifier of the first application is in a group corresponding to a group identifier of the data to be accessed;

in response to a determination that the identifier of the first application is in the group corresponding to the group identifier of the data to be accessed, determining that the first application has satisfied one of the data access conditions;

in response to a determination that the identifier of the first application is not in the group corresponding to the group identifier of the data to be accessed, determining that the first application has not satisfied one of the data access conditions.

In some embodiments, the process is performed in a Linux-based system, the application identifier is the UID, and the group identifier is the GID.

In some embodiments, the determining of whether the identifier of the first application is in the group corresponding to the group identifier of the data to be accessed is based on a Linux authority control technique.

In some embodiments, the application data includes: data in preset directories that correspond to the application.

In some embodiments, before the request from the first application to access the data of the second application is received, the process comprises:

dynamically adjusting domain attributes of the first application, the second application, or both.

In some embodiments, the dynamic adjusting of the domain attributes of the first application, the second application, or both comprises:

adjusting the domain attributes of the relevant application based on a received attribute adjustment command, or adjusting the domain attributes of the relevant application based on a preset periodic authorization technique.

Correspondingly, the present application discloses a device for isolating application data access, comprising:

an access request receiving unit configured to receive a request from a first application to access data of a second application;

an authorization determination unit configured to determine whether the first application is in a domain that has access authorization to the data of the second application;

an access permission unit configured to, in response to a determination that the first application is in the domain that has access authorization to the data of the second application, permit performance of the access operation by the first application;

an access denial unit configured to, in response to a determination that the first application is not in the domain that has access authorization to the data of the second application, deny performance of the access operation by the first application.

In some embodiments, the device further comprises:

a first domain attribute setup unit configured to, during installation of an application, set up domain attributes of the application based on configuration information included in an installation package of the application.

In some embodiments, the device further comprises:

a second domain attribute setup unit configured to, set up the domain attributes of the application in advance based on preset rules.

In some embodiments, the authorization determination unit is configured to determine whether the first application satisfies one of the following data access conditions: the first application belongs to the same domain as the second application, or the domain to which the first application belongs is a child domain of the domain to which the second application belongs, in response to a determination that the first application satisfies one of the following data access conditions, determining that the first application is in a domain that has access authorization to the data of the second application, and in response to a determination that the first application does not satisfy one of the following data access conditions, determining that the first application is not in a domain that has access authorization to the data of the second application.

In some embodiments, the device further comprises:

an application and group identifier assigning unit configured to assign, before the access request receiving unit is activated, a unique application identifier to each application, and respectively assign each preset domain to a unique group, each group having a unique group identifier;

a data identifier specifying unit configured to specify, triggered before the access request receiving unit is activated, a group identifier corresponding to the domain to which the relevant application belongs for the data of each application;

an application identifier addition unit configured to add, triggered before the access request receiving unit is activated, each application identifier into the group corresponding to the domain to which the application belongs, and into the group corresponding to the parent domain of the group to which it belongs;

the authorization determining unit is configured to determine, triggered before the access request receiving unit is activated, whether the identifier of the first application is in a group corresponding to the group identifier of the data to be accessed, in response to a determination that the identifier of the first application is in a group corresponding to the group identifier of the data to be accessed, determine that the first application is in a domain that has access authorization to the data of the second application, and in response to a determination that the identifier of the first application is not in a group corresponding to the group identifier of the data to be accessed, determine that the first application is not in a domain that has access authorization to the data of the second application.

In some embodiments, the authorization determination unit is further configured to, based on a Linux authority control technique, determine whether the identifier of the first application is in a group corresponding to the group identifier of the data to be accessed.

In some embodiments, the device further comprises:

a domain attribute dynamic adjustment unit configured to, before the operation of the access request receiving unit, dynamically adjust the domain attributes of the first application, the second application, or both.

In some embodiments, the domain attribute dynamic adjustment unit is configured to adjust the domain attributes of the relevant application based on a received domain attribute adjustment command, or adjust the domain attributes of the relevant application based on a preset periodic authorization technique.

Compared to conventional techniques, the process for isolating application data access comprises: upon receipt of a request from a first application to access data of a second application, determining whether the first application is in a domain that has access authorization to the data of the second application, and in response to a determination that the first application is in a domain that has access authorization to the data of the second application, permitting the first application to execute the access operation, and in response to a determination the first application is not in a domain that has access authorization to the data of the second application, denying execution of the access operation. In some embodiments, each application belongs to a domain, and has domain attributes that identify the domain; applications that belong to the same domain can access each other's data, and preset hierarchical relationships between different domains exist and application data access rules exist based on the hierarchical relationships.

Regarding the above-described process, because the process employs a domain-based data isolation technique that also has hierarchical relationships, by setting data access rules based on the hierarchical relationships between various domains, the process is related to performing data isolation techniques from multiple dimensions, enabling the provision of reasonable data access authorization for applications, and flexibly implementing data sharing between applications. As an example, introduction of directly or indirectly included parent-child domain relationships between different domains enables the establishment of tree sharing relationships to provide asymmetrical application data access.

In addition, in the event that the data access relationships between applications is to be changed, only dynamic adjustment of the domain attributes of the applications is to be performed. Thus, the same application are permitted to have different data access capabilities in different systems more simply to satisfy security needs in actual application.

BRIEF DESCRIPTION OF THE DRAWINGS

Various embodiments of the invention are disclosed in the following detailed description and the accompanying drawings.

DETAILED DESCRIPTION

Figure 1:
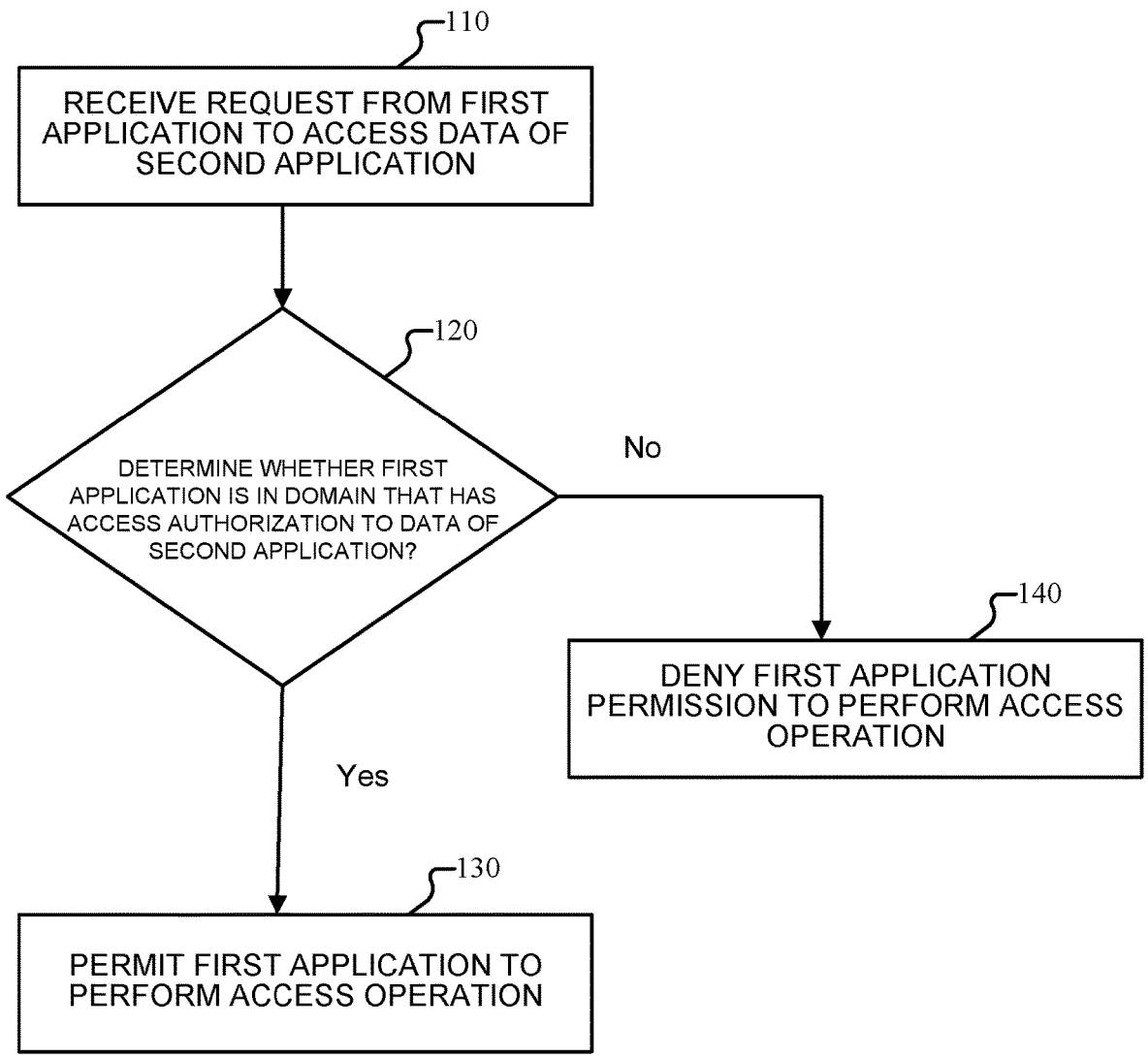
FIG. 1 is a flowchart of an embodiment of a process for isolating application data access.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application discloses a process for isolating application data access and a device for isolating application data access, each of which will be described below.

The process for isolating application data access includes the following: setting up domain attributes in advance for each application to identify a domain to which each application belongs, as well as data access rules based on hierarchical relationships between various domains, upon receipt of a request from a first application to access the data of a second application, in response to a determination that the first application is in a domain that has access authorization to the data of the second application, permitting the first application to perform the access operation, and in response to a determination that the first application is not in a domain that has access authorization to the data of the second application, denying the first application to perform the access operation.

Compared to conventional data access isolation techniques that are solely based on the same UID, because the process utilizes a data isolation technique that is domain-based and has hierarchical relationships, the present application includes implementing data isolation techniques from multiple dimensions, enabling the provision of reasonable data access authorizations for applications, and flexibly implementing data sharing between applications.

In some embodiments, the process for isolating application data access is implemented by an independent service provider, in which case, data access requests between applications are submitted to the service provider, and the service provider determines whether to permit access. In some embodiments, the process is implemented by the accessed application, i.e.: upon receipt of a data access request, the data provider implements the present process to make a determination, and perform the relevant processing based on the determination results of the present process. The embodiments of the present application are described below.

FIG. 1 is a flowchart of an embodiment of a process for isolating application data access. In some embodiments, the process 100 is performed by a device 200 of FIG. 3 and comprises:

Before the process 100 is implemented, domains can be partitioned, hierarchical relationships between different domains and application data access rules can be set up in advance, and application domain attributes can be set up in advance.

In some embodiments, domains refer to logical sets of applications. In some embodiments, certain preset rules are followed to partition the domains. For example, the domains are partitioned based on companies with which applications are affiliated, i.e., by grouping the applications that come from the same company into one domain. In another example, the domains are partitioned based on authors of the applications, i.e., by grouping the applications that come from the same author into one domain. In yet another example, the domains are partitioned based on functions of the applications. For example, applications relating to payment processing are grouped into one domain. Other processes that differ from the above process can also be used to partition domains. The process 100 is not limited to any specific partitioning technique.

Each application belongs to one domain, applications that belong to the same domain can access each other's data, and preset hierarchical relationships between different domains and application data access rules exist based on the hierarchical relationships. In some embodiments, hierarchical attributes can be set up for the domains based on specific needs, and the data access relationships between domains at different hierarchical levels and those at the same hierarchical level can be set in advance. As an example, applications in sibling domains at the same hierarchical level can access each other's data. Using this process 100 to set up data access rules corresponds to adding a hierarchical relationship dimension to the foundation of domain partitioning, thereby implementing data isolation techniques from multiple dimensions, enabling the provision of reasonable data access authorizations for applications, and flexibly implementing data sharing between applications.

As another aspect, the process 100 implements a technique for isolating application data access based on parent-child domains, i.e., the hierarchical relationships between different domains include: directly or indirectly included parent-child domain relationships, and, correspondingly, the application data access rules based on the hierarchical relationships include: applications in child domains can access the data of applications in the parent domain, and other applications belonging to different domains cannot access each other's data, including applications in parent domains, which also cannot access the data of applications in child domains. Using the above data access rules based on parent-child domains, because applications in child domains having the same parent domain can share data via the parent domain, it is therefore possible to clearly establish a tree sharing relationship. At the same time, because applications in the same parent domain cannot access the data of applications in the child domains, asymmetrical application data access requirements can be satisfied.

Please note that the parent-child domain relationship can be directly included, and the parent-child domain relationship can also be indirectly included. In some embodiments, a domain that directly includes or indirectly includes a child domain is known as a parent domain, and similarly, a domain that is directly included or indirectly included in a parent domain is known as a child domain of the parent domain. For example, if domain B is a child domain of domain A, and domain C is the child domain of domain B, then domain A directly includes domain B and indirectly includes domain C. Thus, for domain A, domain B and domain C are both child domains of domain A, and for domain C, domain A and domain B are both parent domains of domain C. An aspect of process 100 is based on parent-child domains.

In some embodiments, each application belongs to one and only one domain, and domain attributes are used to identify the domain to which each application belongs. The domain attributes of each application are typically set up in advance. For example, the domain attributes can be set up during installation of the application based on the configuration information included in the installation package. In another example, the domain attributes can be set up based on preset rules. In yet another example, a combination of the two examples can be used to set up the domain attributes.

The example below is used to explain the process of setting up application domain attributes. In this example, each application has unique package information. The unique package information can be retrieved from the configuration information included in the installation package, and the unique package information includes the following: package=App.Domain, where App is the name of the application, and the Domain information is optional. The preset rules for setting up application domain attributes include the following: first, a preliminary determination of the domain to which the application belongs is made based on the rules table; and for applications that are not specified in the rules table display and for applications that have undergone a preliminary determination, the determination of the domains to which the applications belong can be made based on the domain information included in their unique package information.

For example: a system is partitioned into the following domains in advance: Trust, pay, dom, sub, Cc, g1, and g2, Trust and Cc are domains on the same hierarchical level, Trust is the parent domain of the dom domain, the sub domain, and the pay domain, and the Cc domain is the parent domain of the g1 domain and the g2 domain. In addition, a series of applications having the respective package information shown below have already been installed on the system: A0.sub.dom, A1.sub.dom, A2.Dom, B0, B1, F1.g1.cc, F2.g1.cc, F3.g2.cc, and F4.cc.

The syntax of the preset rules table is as follows: domain name: [package=?]. The specific content of the rules table is as follows:

---

Trust: package= A0.sub.dom
Trust: package = A1.sub.dom
Trust: package = A2. dom
Trust.pay: package = B0
Trust.pay: package = B1

---

Based on the above preset rules and the above rules table, the domain to which each application belongs is specified, and the affiliation relationship is obtained as shown below, and what follows the colon are the names of the applications directly included in the domain.

---

Trust:
-- dom: A2
-- sub: A0, A1
-- pay: B0, B1
Cc: F4
-- g1: F1, F2
-- g2: F3

---

The domain to which each application belongs is determined using the above process 100, and the domain attributes of the applications are correspondingly set up. For example, a domain attribute of the A0 application is the sub domain.

An example of the setting up of the domain attributes based on preset rules has been described above. Other processes that differ from the process described above can be used to set up the domain attributes.

After the domain attributes for the applications have been set up, the operations of process 100 can be performed to isolate data access between the applications.

In 110, the device receives a request from a first application to access data of a second application.

In order to implement their functions, applications typically maintain application data related to the execution of the applications, access the data, and perform read and write operations as desired. Maintenance of the corresponding relationships between the applications and their data is typically the responsibility of the system or the device on which the applications are loaded.

The application data includes: data in preset directories corresponding to the applications. Using the example of the Android system, each application that runs on the system has a preset application directory corresponding to the application (directory names are typically the names of the application packages defined in the AndroidManifest.xml file), and data located in these preset application directories in the form of data files is typically referred to as the application data.

Applications typically have absolute access authorization to their own data, but data access between different applications utilizes the implementation of access isolation controls. After the first application triggers a call operation related to the accessing of the data of the second application, the application, the device, or system implementing the process receives the access request.

In 120, the device determines whether the first application is in a domain that has access authorization to the data of the second application.

In response to a determination that the first application is in the domain that has access authorization to the data of the second application, control passes to operation 130.

In response to a determination that the first application is not in a domain that has access authorization to the data of the second application otherwise, control passes to operation 140.

In operation 120, based on domain attributes of the first application and the second application and preset intradomain and interdomain data access rules, a determination can be made as to whether the first application is in the domain that has access authorization to the data of the second application.

In some embodiments, in the event that the parent-child domains is used, in 120, a determination is made as to whether the first application satisfies one of the following data access conditions: the first application belongs to the same domain as the second application, or the domain to which the first application belongs is a child domain of the domain to which the second application belongs. In response to a determination that one of the conditions is satisfied, the first application is in the domain that has access authorization to the second application.

Figure 2:
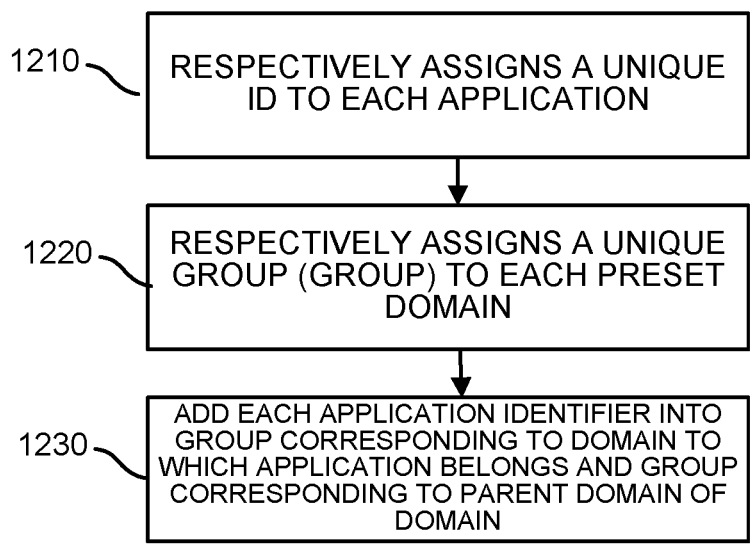
FIG. 2 is a flowchart of an embodiment of a process for determining whether an application satisfies a data access condition.

In some embodiments, to facilitate the above determination operation, groups can be introduced, and the following implementation process can be used. FIG. 2 is a flowchart of an embodiment of a process for determining whether an application satisfies a data access condition. In some embodiments, the process 1200 is an implementation of operation 120 of FIG. 1 and comprises:

In 1210, the device respectively assigns a unique application identifier (ID) to each application.

In 1220, the device respectively assigns a unique group (group) to each preset domain. In some embodiments, each group has a unique group identifier (groupid). The group identifier corresponding to the domain to which each application belongs is specified for each application.

In 1230, the device adds each application identifier into the group corresponding to the domain to which the application belongs and the group corresponding to the parent domain of the domain. As an aspect, the process 1200 can directly determine whether the identifier of the first application is in a group that corresponds to the group identifier of the data to be accessed. In response to a determination that the identifier of the first application is in a group that corresponds to the group identifier of the data to be accessed, this means that the first application is in a domain that has access authorization to the second application; otherwise, the first application is not in the domain that has access authorization to the second application.

Using the above example, the id assigned to each application and the groupid assigned to each domain are as shown below:

```
Trust (groupid = 1000):
-- dom (groupid = 1001): A2 (id=101)
-- sub (groupid = 1002): A0 (id=102), A1 (id=103)
-- pay (groupid = 1003): B0 (id=104), B1 (id=105)
Cc (groupid = 1004): F4 (id=106)
-- g1 (groupid = 1005): F1 (id=107), F2 (id=108)
-- g2 (groupid = 1006): F3 (id=109)
```

The application identifiers included in each group are as follows:

```
Application identifiers contained in groupid = 1000: 101, 102, 103, 104, 105
Application identifiers contained in groupid = 1001: 101, 102, 103
Application identifiers contained in groupid = 1002: 102, 103
Application identifiers contained in groupid = 1003: 104, 105
Application identifiers contained in groupid = 1004: 106, 107, 108, 109
Application identifiers contained in groupid = 1005: 107, 108
Application identifiers contained in groupid = 1006: 109
```

Referring back to 120 of FIG. 1, in the event that the first application is A0 and the second application is A2, because the group identifier for the data of the second application is 1001, and the identifier 102 of the first application A0 is in the group groupid=1001 corresponding to the group identifier of the data to be accessed (i.e., the data of the second application), the determination is that the first application A0 is in a domain that has access authorization to the second application A2, and operation 130 can be performed.

Similarly, in the event that the first application is A2, and the second application is A0, because the group identifier specified for the data of the second application is 1002, and the identifier 101 of the first application A2 is not in the group groupid=1002 corresponding to the data to be accessed (i.e., the data of the second application), the determination is that the first application A2 is not in a domain that has access authorization to the second application A0, and operation 140 can be performed.

The determination process is similar for data access operations between other applications, and will not be repeated here for conciseness. Through the above determination process for access authorization between applications A0 and A2, employing a data access isolation technique that is based on parent-child domains not only achieves data isolation mechanisms from multiple dimensions, enabling the provision of reasonable access authorization for the applications and flexibly implementing data sharing among applications, but also satisfies asymmetrical application data access.

In some embodiments, in the event that process 100 is implemented on a Linux-based system, then the above process 100 can be implemented using the Linux authority control technique, thereby simplifying the implementation process: the application identifier assigned to each application is a unique UID in the system, and the group identifier assigned to each domain is a unique GID in the system. In the event that a first application accesses the data of a second application, the Linux system automatically determines whether the UID is in the group corresponding to the GID, and returns the corresponding determination result, thereby completing the determination operation.

In 130, the device permits the first application to perform the access operation.

In the event that the access operation is performed, a determination has been made that the first application is in a domain that has access authorization to the data of the second application, and the first application is therefore permitted to perform the access operation. For example, the first application can read data files located in a directory corresponding to the second application.

In 140, the device denies the first application permission to perform the access operation.

In the event that the access operation is denied, a determination has been made that the first application is not in a domain that has access authorization to the second application, and the first application is denied performance of the data access operation. For example, the first application is not permitted to read data files located in a directory corresponding to the second application.

At this point, the process for isolating application data access has been described. In some embodiments, the domain attributes of an application are typically set up in advance, but the domain to which an application belongs can be adjusted. Therefore, the domain attributes of applications can be dynamically adjusted, thereby the domain attributes for running an application can be changed, permitting the same application to have different data access capabilities in different systems to satisfy security and other requirements during actual application. In some embodiments, the implementation can be as follows: before a request from a first application to access the data of a second application is received, the domain attributes of the first application and/or the second application are dynamically adjusted, as further explained in the following two situations.

1) The domain attributes of the application can be adjusted based on receiving a domain attribute adjustment command. For example, the first application was initially considered to belong to a secure field. Therefore, domain attributes corresponding to secure fields were set up for the first application. However, after the occurrence of certain events, the first application is redefined, thus requiring adjustment of the domain to which the first application belongs to prevent the first application from causing harm. In some embodiments, the domain attributes can be adjusted based on a domain attribute adjustment command sent by a server responsible for monitoring application security.

2) The domain attributes of the application can be adjusted based on a preset periodic authorization technique. For example, within certain authorized time ranges, the first application can have special authorization to access the data of certain applications; however, during unauthorized time ranges, the first application does not have access capabilities for the certain applications, which is equivalent to recalling its special authorization. In some embodiments, the domain attributes of the first application can be adjusted dynamically based on the preset periodic authorization technique.

Because the process 100 for isolating application data access employs a domain-based data isolation solution that also has hierarchical relationships, through the establishment of data access rules between different domains based on hierarchical levels, the process 100 can perform the equivalent of data isolation techniques from multiple dimensions, and flexibly implement data sharing between applications. As an example, introduction of directly or indirectly including parent-child domain relationships enables the establishment of tree sharing relationships to satisfy asymmetrical application data access.

In addition, if the data access relationships between applications is to be changed, only dynamically adjusting the domain attributes of the applications are performed, which makes it simple and easy to satisfy security requirements, and permit the same application to have different data access capabilities in different systems.

Figure 3:
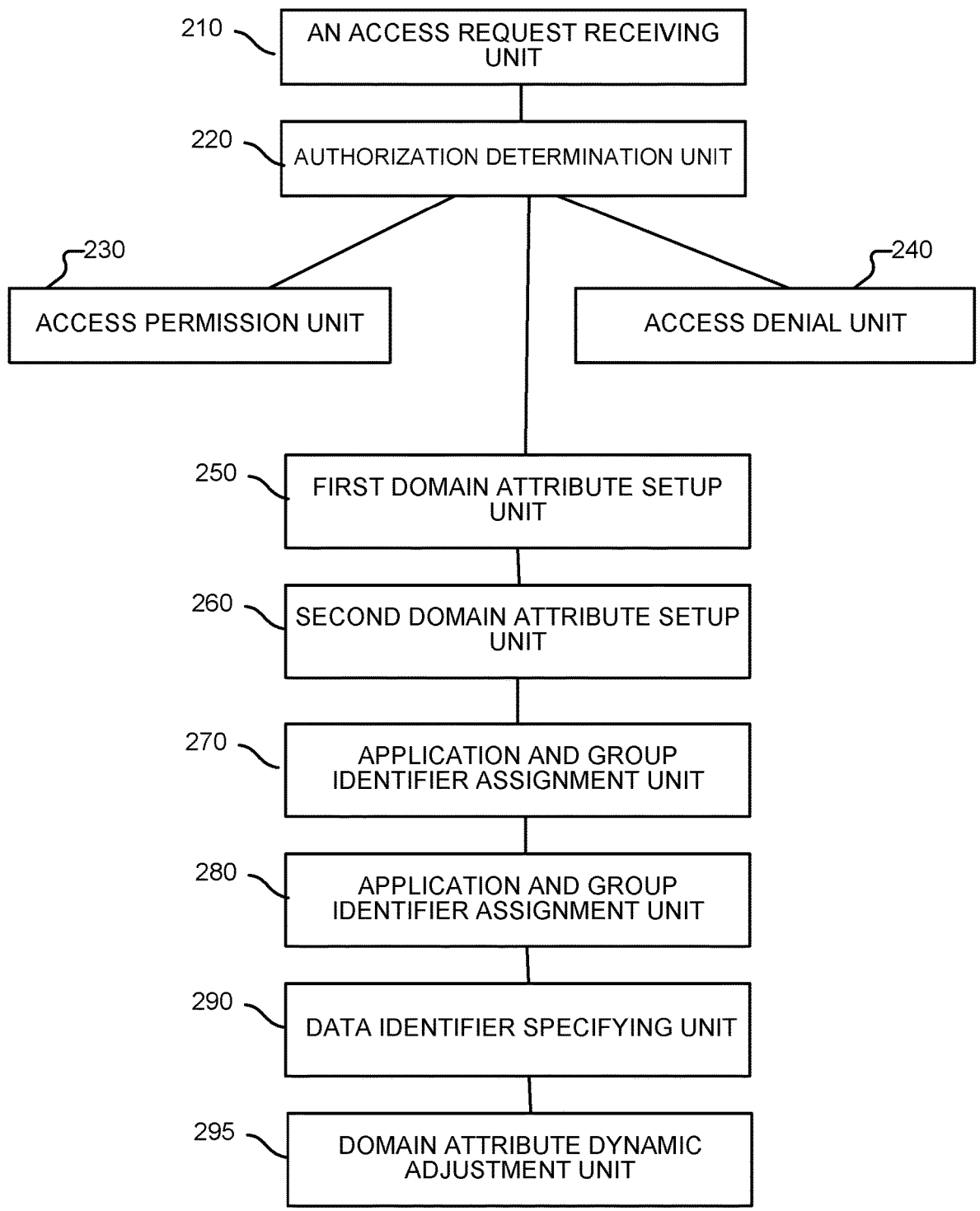
FIG. 3 is a schematic diagram of an embodiment of a device for isolating application data access.

FIG. 3 is a schematic diagram of an embodiment of a device for isolating application data access. In some embodiments, the device 200 implements the process 100 of FIG. 1 and comprises: an access request receiving unit 210, an authorization determination unit 220, an access permission unit 230, and an access denial unit 240.

In some embodiments, the access request receiving unit 210 is configured to receive a request from a first application to access data of a second application.

In some embodiments, the authorization determination unit 220 is configured to determine whether the first application is in a domain that has access authorization to the data of the second application.

In some embodiments, the access permission unit 230 is configured to, in the event that the authorization determination unit 220 determines that the first application is in the domain that has access authorization to the data of the second application, permit the first application to perform the access operation.

In some embodiments, the access denial unit 240 is configured to, in the event that the authorization determination unit 220 determines that the first application is not in the domain that has access authorization to the data of the second application, deny permission for the first application to perform the access operation.

In some embodiments, the device further comprises a first domain attribute setup unit 250.

In some embodiments, the first domain attribute setup unit 250 is configured to, during installation of the application, set up the domain attributes of the application based on configuration information included in an installation package.

In some embodiments, the device further comprises a second domain attribute setup unit 260.

In some embodiments, the second domain attribute setup unit 260 is configured to set up the domain attributes of the application in advance based on preset rules.

In some embodiments, the authorization determination unit 220 is further configured to determine whether the first application satisfies one of the following data access conditions: the first application belongs to the same domain as the second application, or the domain to which the first application belongs is a child domain of the domain to which the second application belongs, in response a determination that the first application satisfies one of the data access conditions, determine the first application to be in a domain that has access authorization to the data of the second application, and in response a determination that the first application does not satisfy one of the data access conditions, determine the first application not to be in a domain that has access authorization to the data of the second application.

In some embodiments, the device further comprises: an application and group identifier assignment unit 270, an application and group identifier assignment unit 280, and a data identifier specifying unit 290.

In some embodiments, before receiving the request from the first application to access data of the second application, the application and group identifier assignment unit 270 is configured to respectively assign unique application identifiers to each application, and respectively assign each preset domain to a unique group with each group having a unique group identifier.

In some embodiments, the data identifier specifying unit 280 is configured to specify the group identifier corresponding to the domain to which the relevant application belongs for the data of each application.

In some embodiments, the application identifier adding unit 290 is configured to add the application identifiers into the groups corresponding to the domains to which the applications belong, and the groups corresponding to the parent domains to which they belong.

In some embodiments, the authorization determination unit 220 is further configured to determine whether the identifier of the first application is in a group corresponding to the group identifier of the data to be accessed, in response to a determination that the identifier of the first application is in a group corresponding to the group identifier of the data to be accessed, determine that the first application is in a domain that has access authorization to the data of the second application, and in response to a determination that the identifier of the first application is not in a group corresponding to the group identifier of the data to be accessed, determine that the first application is not in a domain that has access authorization to the data of the second application.

In some embodiments, the authorization determination unit 220 is further configured to utilize the Linux authority control technique to determine whether the identifier of the first application is in a group corresponding to the group identifier of the data to be accessed.

In some embodiments, the device further comprises a domain attribute dynamic adjustment unit 295

In some embodiments, the domain attribute dynamic adjustment unit 295 is configured to, before the access request receiving unit 210 operates, dynamically adjust the domain attributes of the first application, the second application, or a combination thereof.

In some embodiments, the domain attribute dynamic adjustment unit 295 is further configured to adjust the domain attributes of the relevant applications based on receiving a domain attribute adjustment command, or, adjust the domain attributes of the relevant applications based on a preset periodic authorization technique.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 4:
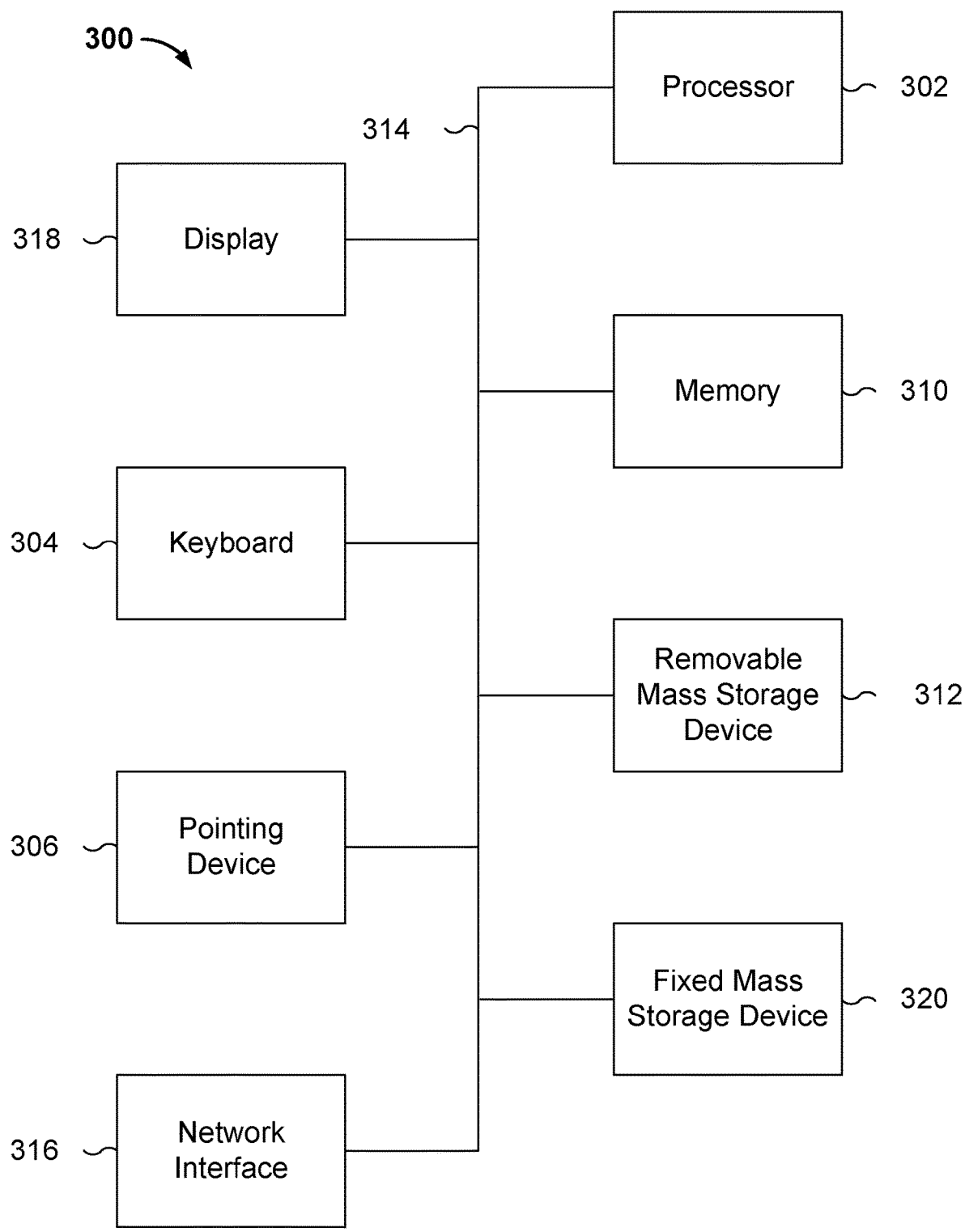
FIG. 4 is a functional diagram illustrating a programmed computer system for isolating application data access in accordance with some embodiments.

FIG. 4 is a functional diagram illustrating a programmed computer system for isolating application data access in accordance with some embodiments. As will be apparent, other computer system architectures and configurations can be used to isolate application data access. Computer system 300, which includes various subsystems as described below, includes at least one microprocessor subsystem (also referred to as a processor or a central processing unit (CPU)) 302. For example, processor 302 can be implemented by a single-chip processor or by multiple processors. In some embodiments, processor 302 is a general purpose digital processor that controls the operation of the computer system 300. Using instructions retrieved from memory 310, the processor 302 controls the reception and manipulation of input data, and the output and display of data on output devices (e.g., display 318).

Processor 302 is coupled bi-directionally with memory 310, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 302. Also as is well known in the art, primary storage typically includes basic operating instructions, program code, data and objects used by the processor 302 to perform its functions (e.g., programmed instructions). For example, memory 310 can include any suitable computer-readable storage media, described below, depending on whether, for example, data access needs to be bi-directional or uni-directional. For example, processor 302 can also directly and very rapidly retrieve and store frequently needed data in a cache memory (not shown).

A removable mass storage device 312 provides additional data storage capacity for the computer system 300, and is coupled either bi-directionally (read/write) or uni-directionally (read only) to processor 302. For example, storage 312 can also include computer-readable media such as magnetic tape, flash memory, PC-CARDS, portable mass storage devices, holographic storage devices, and other storage devices. A fixed mass storage 320 can also, for example, provide additional data storage capacity. The most common example of mass storage 320 is a hard disk drive. Mass storages 312 and 320 generally store additional programming instructions, data, and the like that typically are not in active use by the processor 302. It will be appreciated that the information retained within mass storages 312 and 320 can be incorporated, if needed, in standard fashion as part of memory 310 (e.g., RAM) as virtual memory.

In addition to providing processor 302 access to storage subsystems, bus 314 can also be used to provide access to other subsystems and devices. As shown, these can include a display monitor 318, a network interface 316, a keyboard 304, and a pointing device 306, as well as an auxiliary input/output device interface, a sound card, speakers, and other subsystems as needed. For example, the pointing device 306 can be a mouse, stylus, track ball, or tablet, and is useful for interacting with a graphical user interface.

The network interface 316 allows processor 302 to be coupled to another computer, computer network, or telecommunications network using a network connection as shown. For example, through the network interface 316, the processor 302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 302 can be used to connect the computer system 300 to an external network and transfer data according to standard protocols. For example, various process embodiments disclosed herein can be executed on processor 302, or can be performed across a network such as the Internet, intranet networks, or local area networks, in conjunction with a remote processor that shares a portion of the processing. Additional mass storage devices (not shown) can also be connected to processor 302 through network interface 316.

An auxiliary I/O device interface (not shown) can be used in conjunction with computer system 300. The auxiliary I/O device interface can include general and customized interfaces that allow the processor 302 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 4 is but an example of a computer system suitable for use with the various embodiments disclosed herein. Other computer systems suitable for such use can include additional or fewer subsystems. In addition, bus 314 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
respectively assigning a unique application identifier to each application;
respectively assigning a unique group to each preset domain, each group having a unique group identifier, wherein:
the unique group identifier is a group ID (GID);
the unique group identifier corresponds to the domain to which each application belongs; and
an identifier of each application is added into a group corresponding to the domain to which the application belongs, and the group corresponds to a parent domain of the domain;
receiving a request from a first application to access data of a second application;
determining whether the first application is in a domain that has access authorization to the data of the second application, comprising:
determining whether the first application is in a domain that is a child domain of the domain to which the second application belongs; and
in response to a determination that the first application is in a domain that is a child domain of the domain to which the second application belongs, determining that the first application has satisfied one of one or more application data access rules;
in response to a determination that the first application is in a domain that has access authorization to the data of the second application, permitting the first application to perform the access operation; and
in response to a determination that the first application is not in a domain that has access authorization to the data of the second application, denying the first application permission to perform the access operation; wherein:
the first application belongs to a first domain, and has one or more first domain attributes that identify the first domain;
the second application belongs to a second domain, and has one or more second domain attributes that identify the second domain; and
the first application accesses the data of the second application according to the one or more application data access rules that exist based on preset hierarchical relationships between the first domain and the second domain.

2. The method as described in claim 1, wherein prior to the receiving of the request from the first application to access the data of the second application:
during an installation of one application of the applications, setting up domain attributes of the one application based on configuration information included in an installation package of the one application.

3. The method as described in claim 1, wherein the domain attributes of applications are set up in advance based on preset rules.

4. The method as described in claim 1, wherein:
the preset hierarchical relationships comprise: parent-child domain relationships; and
the one or more application data access rules based on the hierarchical relationships comprise:
one or more applications in a child domain are authorized to access data of one or more applications in a parent domain; and
other applications belonging to different domains are not authorized to access each other's data, the different domains not relating to the parent domain or the child domain.

5. The method as described in claim 4, wherein the determining of whether the first application is in the domain that has access authorization to the data of the second application comprises:

determining whether the first application belongs to the same domain as the second application, or the first domain is a child domain of the second domain.

6. A method, comprising:

respectively assigning a unique application identifier to each application;

respectively assigning a unique group to each preset domain, each group having a unique group identifier, wherein the group identifier corresponds to the domain to which each application belongs, and wherein an identifier of each application is added into a group corresponding to the domain to which the application belongs, and the group corresponds to a parent domain of the domain;

receiving a request from a first application to access data of a second application;

determining whether the first application is in a domain that has access authorization to the data of the second application, comprising:

determining whether an application identifier of the first application is in a group corresponding to a group identifier of the data to be accessed;

in response to a determination that the application identifier of the first application is in a group corresponding to the group identifier of the data to be accessed, determining that the first application has satisfied one of one or more application data access rules; and in response to a determination that the identifier of the first application is not in a group corresponding to the group identifier of the data to be accessed, determining that the first application has not satisfied one of the data access rules;

in response to a determination that the first application is in a domain that has access authorization to the data of the second application, permitting the first application to perform the access operation; and in response to a determination that the first application is not in a domain that has access authorization to the data of the second application, denying the first application permission to perform the access operation; wherein:

the first application belongs to a first domain, and has one or more first domain attributes that identify the first domain;

the second application belongs to a second domain, and has one or more second domain attributes that identify the second domain;

the first application accesses the data of the second application according to the one or more application data access rules that exist based on preset hierarchical relationships between the first domain and the second domain;

the method is performed in a Linux-based software system;

the unique application identifier is a user ID (UID);

the unique group identifier is a group ID (GID); and the determining of whether the identifier of the first application is in a group corresponding to the unique group identifier of the data to be accessed is achieved using a Linux authority control technique.

7. The method as described in claim 1, wherein the application data comprises: data in preset directories corresponding to one application of the applications.

8. The method as described in claim 1, wherein prior to the receiving of the request from the first application to access the data of the second application, the method further comprises:

dynamically adjusting domain attributes of the first application, domain attributes of the second application, or a combination thereof.

9. The method described in claim 8, wherein the dynamically adjusting of the domain attributes of the first application, the domain attributes of the second application, or a combination thereof comprises:

adjusting the domain attributes of one application based on a received domain attribute adjustment command; or, adjusting the domain attributes of one application based on a preset periodic authorization technique.

10. A system, comprising:

a processor; and a memory coupled with the processor, wherein the memory is configured to provide the processor with instructions which when executed cause the processor to:

respectively assign a unique application identifier to each application;

respectively assign a unique group to each preset domain, each group having a unique group identifier, wherein:

the unique group identifier is a group ID (GID);

the unique group identifier corresponds to the domain to which each application belongs; and an identifier of each application is added into a group corresponding to the domain to which the application belongs, and the group corresponds to a parent domain of the domain;

receive a request from a first application to access data of a second application;

determine whether the first application is in a domain that has access authorization to the data of the second application, comprising to:

determine whether the first application is in a domain that is a child domain of the domain to which the second application belongs; and in response to a determination that the first application is in a domain that is a child domain of the domain to which the second application belongs, determine that the first application has satisfied one of one or more application data access rules;

in response to a determination that the first application is in a domain that has access authorization to the data of the second application, permit the first application to perform the access operation; and in response to a determination that the first application is not in a domain that has access authorization to the data of the second application, deny the first application permission to perform the access operation: wherein:

the first application belongs to a first domain, and has one or more first domain attributes that identify the first domain;

the second application belongs to a second domain, and has one or more second domain attributes that identify the second domain; and the first application accesses the data of the second application according to the one or more application data access rules that exist based on preset hierarchical relationships between the first domain and the second domain.

11. The system as described in claim 10, wherein prior to the receiving of the request from the first application to access the data of the second application, the processor is configured to:

during an installation of one application of the applications, set up domain attributes of the one application based on configuration information included in an installation package of the one application.

12. The system as described in claim 10, wherein the domain attributes of applications are set up in advance based on preset rules.

13. The system as described in claim 10, wherein the determining of whether the first application is in the domain that has access authorization to the data of the second application comprises to:
   determine whether the first application belongs to the same domain as the second application, or the first domain is a child domain of the second domain.

14. A system, comprising:
   a processor; and
   a memory coupled with the processor, wherein the memory is configured to provide the processor with instructions which when executed cause the processor to:
      respectively assign a unique application identifier to each application;
      respectively assign a unique group to each preset domain, each group having a unique group identifier, wherein the group identifier corresponds to the domain to which each application belongs, and wherein an identifier of each application is added into a group corresponding to the domain to which the application belongs, and the group corresponds to a parent domain of the domain;
      receive a request from a first application to access data of a second application;
      determine whether the first application is in a domain that has access authorization to the data of the second application, comprising to:
         determine whether the identifier of the first application is in a group corresponding to the group identifier of the data to be accessed;
         in response to a determination that the identifier of the first application is in a group corresponding to the group identifier of the data to be accessed, determine that the first application has satisfied one of the data access rules; and
         in response to a determination that the identifier of the first application is not in a group corresponding to the group identifier of the data to be accessed, determine that the first application has not satisfied one of the data access rules;
      in response to a determination that the first application is in a domain that has access authorization to the data of the second application, permit the first application to perform the access operation; and
      in response to a determination that the first application is not in a domain that has access authorization to the data of the second application, deny the first application permission to perform the access operation:
   wherein:
      the first application belongs to a first domain, and has one or more first domain attributes that identify the first domain;
      the second application belongs to a second domain, and has one or more second domain attributes that identify the second domain;
      the first application accesses the data of the second application according to one or more application data access rules that exist based on preset hierarchical relationships between the first domain and the second domain; and
      the determining of whether the identifier of the first application is in a group corresponding to the group identifier of the data to be accessed is achieved using a Linux authority control technique.

15. The system as described in claim 10, wherein prior to the receiving of the request from the first application to access the data of the second application, the processor is further configured to:
   dynamically adjust domain attributes of the first application, domain attributes of the second application, or a combination thereof.

16. The system as described in claim 15, wherein the dynamically adjusting of the domain attributes of the first application, the domain attributes of the second application, or a combination thereof comprises to:
   adjust the domain attributes of one application based on a received domain attribute adjustment command; or,
   adjust the domain attributes of one application based on a preset periodic authorization technique.

17. A computer program product being embodied in a tangible non-transitory computer readable storage medium and comprising computer instructions for:
   respectively assigning a unique application identifier to each application;
   respectively assigning a unique group to each preset domain, each group having a unique group identifier, wherein:
      the unique group identifier is a group ID (GID);
      the unique group identifier corresponds to the domain to which each application belongs; and
      an identifier of each application is added into a group corresponding to the domain to which the application belongs, and the group corresponds to a parent domain of the domain;
   receiving a request from a first application to access data of a second application;
   determining whether the first application is in a domain that has access authorization to the data of the second application, comprising:
      determining whether the first application is in a domain that is a child domain of the domain to which the second application belongs; and
      in response to a determination that the first application is in a domain that is a child domain of the domain to which the second application belongs, determining that the first application has satisfied one of one or more application data access rules;
   in response to a determination that the first application is in a domain that has access authorization to the data of the second application, permitting the first application to perform the access operation; and
   in response to a determination that the first application is not in a domain that has access authorization to the data of the second application, denying the first application permission to perform the access operation; wherein:
      the first application belongs to a first domain, and has one or more first domain attributes that identify the first domain;
      the second application belongs to a second domain, and has one or more second domain attributes that identify the second domain; and
      the first application accesses the data of the second application according to the one or more application data access rules that exist based on preset hierarchical relationships between the first domain and the second domain.

18. A computer program product being embodied in a tangible non-transitory computer readable storage medium and comprising computer instructions for:
respectively assigning a unique application identifier to each application;
respectively assigning a unique group to each preset domain, each group having a unique group identifier, wherein the group identifier corresponds to the domain to which each application belongs, and wherein an identifier of each application is added into a group corresponding to the domain to which the application belongs, and the group corresponds to a parent domain of the domain;
receiving a request from a first application to access data of a second application;
determining whether the first application is in a domain that has access authorization to the data of the second application, comprising:
determining whether an application identifier of the first application is in a group corresponding to a group identifier of the data to be accessed;
in response to a determination that the application identifier of the first application is in a group corresponding to the group identifier of the data to be accessed, determining that the first application has satisfied one of one or more application data access rules; and
in response to a determination that the identifier of the first application is not in a group corresponding to the group identifier of the data to be accessed, determining that the first application has not satisfied one of the data access rules;
in response to a determination that the first application is in a domain that has access authorization to the data of the second application, permitting the first application to perform the access operation; and
in response to a determination that the first application is not in a domain that has access authorization to the data of the second application, denying the first application permission to perform the access operation; wherein:
the first application belongs to a first domain, and has one or more first domain attributes that identify the first domain;
the second application belongs to a second domain, and has one or more second domain attributes that identify the second domain;
the first application accesses the data of the second application according to the one or more application data access rules that exist based on preset hierarchical relationships between the first domain and the second domain;
the method is performed in a Linux-based software system;
the unique application identifier is a user ID (UID);
the unique group identifier is a group ID (GID); and
the determining of whether the identifier of the first application is in a group corresponding to the group identifier of the data to be accessed is achieved using a Linux authority control technique.

* * * * *